No. 622,589. Patented Apr. 4, 1899.
C. ANDERS.
REVOLVING STALK CUTTER.
(Application filed Apr. 26, 1898.)
(No Model.)

Witnesses
D. H. Blakelock
John H. Holt

Inventor
Charles Anders,
by Wilkinson & Fisher
Attorneys.

THE NORRIS PETERS CO., PHOTO-LITHO., WASHINGTON, D. C.

UNITED STATES PATENT OFFICE.

CHARLES ANDERS, OF CHALER, LOUISIANA.

REVOLVING STALK-CUTTER.

SPECIFICATION forming part of Letters Patent No. 622,589, dated April 4, 1899.

Application filed April 26, 1898. Serial No. 678,889. (No model.)

*To all whom it may concern:*

Be it known that I, CHARLES ANDERS, a citizen of the United States, residing at Chaler, in the parish of Natchitoches and State of Louisiana, have invented certain new and useful Improvements in Revolving Stalk-Cutters; and I do hereby declare the following to be a full, clear, and exact description of the invention, such as will enable others skilled in the art to which it appertains to make and use the same.

My invention relates to improvements in revolving stalk-cutters, and has for its object to provide a device of this nature which may be readily attached to a portion of the running-gear of an ordinary farm-wagon when used, thus greatly reducing expense and economizing storage-space when not in use.

My invention consists in the novel construction and arrangement of parts hereinafter described and claimed and shown in the accompanying drawings, wherein the same letters of reference indicate corresponding parts throughout both views.

Figure 1:
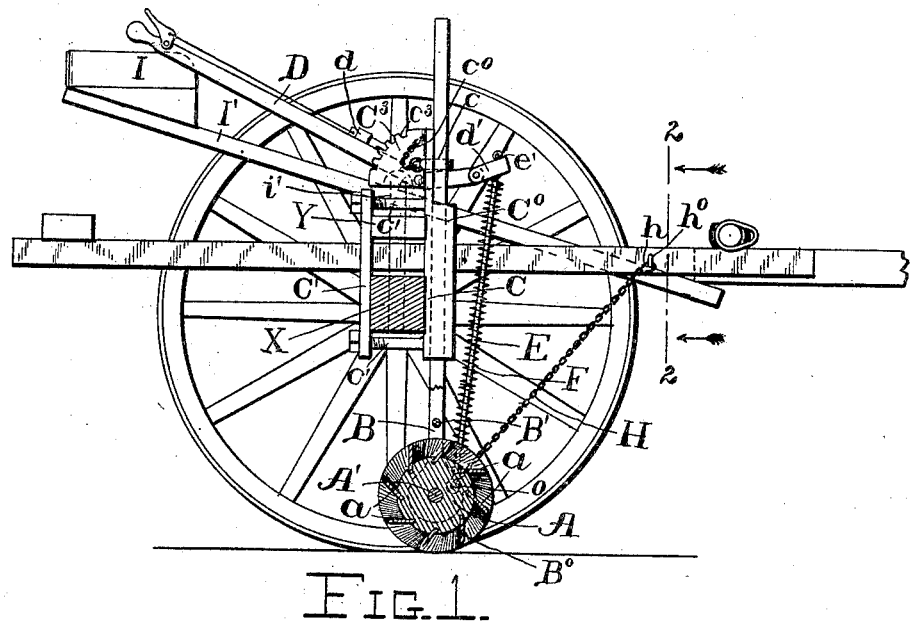
Figure 2:
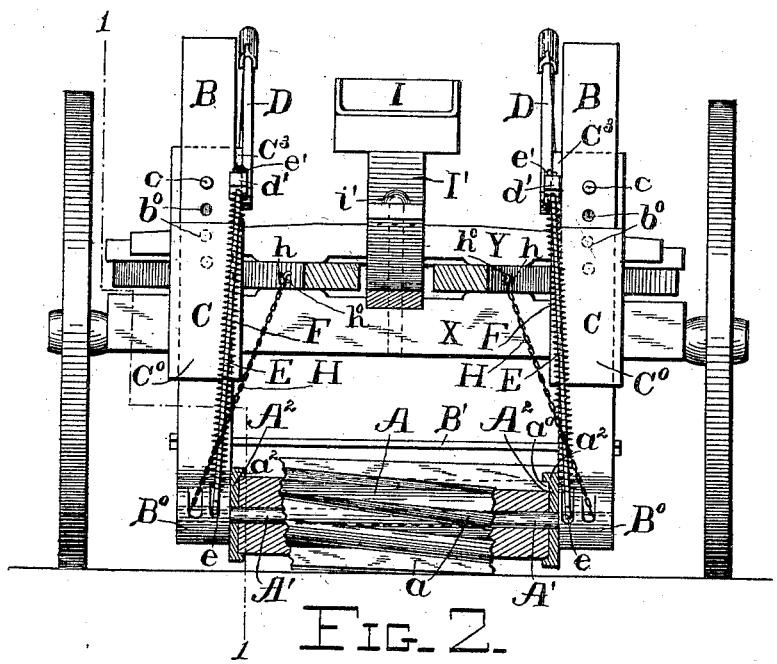

Figure 1 represents a side elevation, partly in section, on the line 1 1 in Fig. 2, showing my stalk-cutter attachment as applied to the fore part of an ordinary farm-wagon uncoupled; and Fig. 2 represents a front elevation, partly in section, on the line 2 2 in Fig. 1 and looking in the direction of the arrows, of the attachment as applied to the fore part of a farm-wagon. The cutter-roller is shown as broken away to better illustrate its construction.

A represents a roller made, preferably, of wood and through which passes a shaft $A'$, the ends of which are journaled in uprights B B. Metallic caps $A^2 A^2$ are fitted over the ends of the shaft $A'$ and inclose the ends of the said roller, as shown in Fig. 2. The roller is rigidly mounted upon the said shaft, the ends of the latter turning in the said uprights.

The roller A is provided with a number of spirally-arranged blades $a$, which are secured to the surface of the said roller in any suitable manner or fitted into longitudinal grooves formed spirally upon the periphery of the said roller, as shown in the drawings, wherein the circular flanges $a^2 a^2$ on the caps $A^2 A^2$ engage in notches $a^0 a^0$ in the ends of the said blades and serve to hold the said blades in said grooves. The lower portions $B^0 B^0$ of the uprights B B, wherein the ends of the shaft $A'$ are journaled, are enlarged somewhat, as seen in Fig. 2 and indicated in dotted lines in Fig. 1, and the said uprights are connected by a rod $B'$ a short distance above the edges of the blades of the roller. This rod not only serves to hold the lower ends of the uprights firmly, but also serves to intercept any trash that would otherwise be carried around by the said blades, as will be obvious.

C C represent a pair of large heavy clips, each having a pair of heavy bolts $c' c'$, provided with nuts engaging the screw-threaded ends thereof, and plates $C' C'$, provided with openings near their ends, fit upon these bolts, as seen in Fig. 1. The said clips have each an elongated rectangular sleeve $C^0$ upon its closed side, the opening through each of said sleeves being just of a proper size to allow the free passage of one of the uprights B. The walls of the said sleeves should be heavy and strong enough to bear the strain that would be brought upon them by the irregularities in the ground through the uprights B B. The size of the said clips should be such as to adapt them for clamping upon the axle and bolster of an ordinary farm-wagon, which is of a construction similar to that shown in the drawings, X indicating the axle, and Y indicating the bolster, of the fore part of the wagon. A segmental plate $C^3$, provided with teeth $c^3$, is formed integral with or attached rigidly to the said clip, as seen in Fig. 1, and a hand-lever D, provided with a well-known catch $d$, adapted to engage the said teeth, is pivoted to said clip and has a jointed shorter arm $d'$, provided with an opening therethrough for the passage of a rod E, the lower end of which is pivotally connected, as at $e$, to the upright B and the upper end of which passes through the said opening in the jointed end of said lever and is retained by a pin $e'$, which passes laterally through an eye in the upper end of said rod E. A coil-spring F incloses the said rod E and allows the roller carried in the said uprights to rise more or less, according to the irregularities of the ground when in use, and at the same time tends to hold the said roller down when in operation.

In use the clips C C are clamped upon the axle and bolster of the fore part of the wagon in the manner shown, with the hollow sleeves for the uprights upon the forward side of the axle. The said uprights and the bladed roller carried thereby are thus held rigidly against lateral movement, but have a vertical movement with respect to said sleeves, which is controlled by the hand-levers D D and the coil-springs F F, the latter constituting a yielding connection between the levers D D and the bladed roller, as above described.

A pair of chains H H, connected at one end to the lower portion of the uprights B B and provided at the other end with hooks $h\ h$, which may engage staples, such as $h^0\ h^0$, on the wagon-hounds, serve to assist in taking up the backward strain upon the said uprights.

In order that the bladed roller may be held rigidly, a plurality of openings $b^0\ b^0$ may be provided through the uprights B B, and pins $c\ c$, attached to chains $c^0\ c^0$, secured to the clips C C, are provided for insertion into said openings through corresponding openings in said clip. Adjustment may be had vertically by reason of there being several openings in each set, as seen in Fig. 2.

Any suitable kind of a seat may be provided for the driver; but I have illustrated a simple arrangement wherein a stout plank I' has a seat mounted upon its rear end, and resting upon the said bolster, where it is held by the coupling-pin of the wagon, at its forward end passes between the wagon-hounds at their forward portion and engages beneath the rear end of the tongue, as seen in Fig. 1. The driver sitting upon the seat thus arranged may operate the hand-levers D D with perfect ease as desired.

The operation of my stalk-cutting attachment will be obvious from the foregoing description.

When not in use, the clips C C may be readily removed and the attachment stored away until again needed. It will be seen that the construction of the said attachment renders it adaptable to any ordinary farm-wagon, such wagons having constructions sufficiently similar in all respects necessary for the purposes of my invention.

Having thus described my invention, what I claim, and desire to secure by Letters Patent of the United States, is—

1. In a stalk-cutter attachment, the combination with a pair of clips adapted to be clamped upon the axle of a wagon, and each carrying an elongated hollow sleeve; of a pair of uprights passing through said hollow sleeves; a bladed roller rotatably mounted between the lower ends of said uprights; and means for controlling the vertical adjustment of said bladed roller, substantially as described.

2. In a stalk-cutter attachment, the combination with a pair of clips adapted to be clamped upon the axle of a wagon, and each carrying an elongated hollow sleeve; of a pair of uprights passing through said hollow sleeves; a bladed roller rotatably mounted between the lower ends of said uprights; a pair of levers pivoted to said clips, and means for holding said levers in the desired adjustment; a pair of rods pivotally connected to said uprights and also pivotally connected to said levers; and a pair of coil-springs surrounding said rods, and constituting a yielding connection between said uprights and said levers, substantially as described.

3. In a stalk-cutter attachment, the combination with a pair of clips adapted to be clamped upon the axle of a wagon, and each carrying an elongated hollow sleeve; of a pair of uprights passing through said hollow sleeves; a bladed roller rotatably mounted between the lower ends of said uprights; a rod connecting said uprights at a short distance above said bladed roller; a pair of levers for adjusting said roller vertically, and connections between said roller and said levers yielding to the upward movement of said roller, but unyielding to the downward movement thereof from the normal position thereof, substantially as described.

4. In a stalk-cutter attachment, the combination with the clip C provided with bolts $c'$ $c'$ and plate C', and having elongated hollow sleeve $C^0$ formed integral therewith; of an upright passing through said sleeve, and means for adjusting said upright vertically, and controlling such adjustment, substantially as described.

In testimony whereof I affix my signature in presence of two witnesses.

CHARLES ANDERS.

Witnesses:
 OSCAR HARDEE,
 B. F. MILLSTED.